United States Patent [19]

Keene

[11] 4,097,297
[45] Jun. 27, 1978

[54] BARRIER COATINGS

[75] Inventor: Frederick J. Keene, Medford Lakes, N.J.

[73] Assignee: E. I. Du Pont de Nemours and Company, Wilmington, Del.

[21] Appl. No.: 602,753

[22] Filed: Aug. 7, 1975

[51] Int. Cl.$^2$ .............................. C08L 1/18; C09J 3/04
[52] U.S. Cl. ..................................... 106/177; 106/195
[58] Field of Search .................... 260/30.6 R, 955; 106/177, 195, 170; 428/422

[56] References Cited

U.S. PATENT DOCUMENTS

| 3,083,224 | 3/1963 | Brace | 260/955 |
| 3,096,207 | 7/1963 | Cohen | 260/955 |
| 3,595,944 | 7/1971 | Manning et al. | 428/21 |
| 3,664,987 | 5/1972 | Moyer et al. | 106/177 |

OTHER PUBLICATIONS

Chem. Abst. 60:10810h, 1964.
Chem. Abst. 73:91644j, 1970.

*Primary Examiner*—Joan E. Welcome

[57] ABSTRACT

An oil and water repellent barrier coating composition comprising a non-aqueous solution of:
 (A) a film forming polymer; and
 (B) a fluorochemical surface tension modifier is provided. Optionally the barrier coating composition can also contain a plasticizer. Such composition is useful in imparting oil, grease, and water repellency to cellulosic substrates such as paper, paperboard, cellophane, and wood and provides improved coatings for packaging and non-packaging materials.

3 Claims, No Drawings

BARRIER COATINGS

BACKGROUND OF THE INVENTION

1. Field of the Invention

This invention is related to barrier coatings and particularly to oil and water repellent barrier coating compositions based on film forming polymers such as nitrocellulose and surface tension modifiers such as anionic fluorochemical surfactants.

2. Description of Prior Art

A variety of barrier coatings are utilized by the packaging industry to provide barrier properties to packaging materials.

Preformed films of poly(vinylidene chloride) or polyethylene provide good grease and water repellency but are difficult to apply and are expensive.

Aluminum foil, when laminated to paper, imparts good barrier properties but is expensive and is not practical for many end-use applications.

Coatings prepared from solutions of high ethylene content ethylene/vinyl acetate copolymers, formulated with wax, have good barrier properties toward water but are deficient toward oil and grease.

Films based on copolymers of vinylidene chloride/acrylonitrile (known as "Saran" and available from the Dow Chemical Company) are moisture proof, are resistant to permeation by oil and grease but are expensive and need to be applied as thick coatings, as high as 12 pounds/ream.

Formulated coatings, based on nitrocellulose lacquer, as shown for example in U.S. Pat. No. 2,337,939, issued Feb. 19, 1940 to J. P. Sermattel, are moisture-proof but have poor resistance to permeation by oil and grease.

When paper or paperboard is treated with a water/Freno ® (registered trademark of E. I. du Pont de Nemours and Co., a fluoro-haloalkane) dispersion of an anionic fluorochemical surfactant, excellent oil and grease repellency results. However, in contact with water, grease repellency is greatly diminished and therefore such coatings cannot be used for packaging materials for wet and greasy foods.

Films obtained from aqueous solutions of film forming polymers such as polyvinyl alcohol with fluorochemical surfactants are very effective for oil and grease repellency but they too have diminished barrier properties when in contact with water and, in addition, tend to foam during the application process.

SUMMARY OF THE INVENTION

According to the present invention there is provided an oil and water repellent barrier coating composition consisting essentially of a non-aqueous solution of:

(A) 25-99.5 parts by weight, based on the weight of (A) plus (B) plus (C), of a film forming polymer having a glass transition temperature above 45° C;

(B) 0.5-10 parts by weight, based on the weight of (A) plus (B) plus (C), of a fluorochemical surface tension modifier; and (C) 0-75 parts by weight, based on the weight of (A) plus (B) plus (C), of a plasticizer; and optionally, wax, coalescing solvent, and dyes.

DESCRIPTION OF THE INVENTION

The barrier coating of the invention contains a film forming polymer, a fluorochemical surface tension modifier, and a plasticizer. Optionally, if desired for certain specific uses, the coating composition can also contain such additives as wax or coalescing solvent.

The coating composition can be applied by methods conventionally used in the flexible packaging industry such as by gravure roll, flexographically, or by spray or roller coating. The coatings so applied, when dried at 65°–205° C during an approximately 1-5 second residence time, have excellent oil and water repellency and are non-blocking at or below temperatures commonly employed for paper storage, about 45° C. The coating can also be dried at room temperature.

The film forming polymers utilized in this invention are present to the extent of 25-99.5 parts by weight of the total coating and preferably 40-60 parts. Other preferred ranges are 45-50, 65-76, and 98-99 parts by weight. They usually have a glass transition temperature above 45° C to avoid blocking during storage of the coated substrates. Among useful film forming polymers are nitrocellulose, copolymers of ethylene/vinyl acetate, copolymers of stryene/methyl methacrylate, poly(methyl methacrylate), poly(α-methylstyrene), and poly(vinylidene chloride). Nitrocellulose is a preferred film forming polymer. Barrier coatings of this invention, based on nitrocellulose, have much increased water and oil repellency over nitrocellulose alone.

Most commonly, the so-called high-nitrogen (11.8–12.2% by weight) nitrocellulose is utilized as the film forming polymer of this invention. Nitrocellulose lacquers containing medium- or low-nitrogen, 11.3–11.7% and 10.9–11.2%, respectively, can also be used.

Nitrocellulose can be dissolved in a variety of solvents, although the term "solubility," in its usual sense, is not strictly applicable to colloidal materials such as nitrocellulose. However, in the lacquer industry "solubility" is understood to refer to the ability of nitrocellulose to be dispersed completely and uniformly in a solvent or a solvent mixture so that the resulting solution is homogeneous and free from haze or gel. With this meaning for the term, solubility of nitrocellulose in a given system is a function of nitrogen content primarily and of viscosity to a lesser extent.

Nitrocellulose of high nitrogen content (11.8–12.2%) is soluble in suitably formulated mixtures containing, individually or in combination, the following: esters, ketones, ether-alcohol mixtures, and certain glycols and glycol ethers. Nitrocellulose of medium nitrogen content (11.3–11.7%) is soluble in ether-alcohol mixtures, esters, ketones, or alcohols of low molecular weight. Nitrocellulose of low nitrogen content (10.9–11.2%) likewise can be dissolved in suitably formulated mixtures containing esters, ketones and alcohols; however, this type of nitrocellulose is soluble in 190 proof ethanol. The replacement of ethanol with an active solvent, such as an ester or ketone, in amounts up to about 10% of the total solvent weight, improves the homogeneity of the ethanol solutions. Nitro-cellulose is substantially insoluble in water.

For convenience of application the film forming polymer, such as nitrocellulose, utilized in this invention will be used in solution form at viscosities dictated by the method of application. Often, if nitrocellulose is the polymer of choice, solution viscosities will range from 0.01–10 seconds, preferably from 0.1–5, as measured by the falling ball method (ASTM Method D 301-50).

The fluorochemical surface tension modifiers utilized in the barrier coating of this invention are surface active agents containing fluoroalkyl groups. They are present to the extent of 0.5–10 parts by weight of the coating, preferably 1–3 parts, and most preferably 1–2, by weight. In one preferred composition, the fluorochemical is present at the 2 parts by weight level along with 70 parts of the film forming polymer. The remainder is a plasticizer, to be discussed below. Among useful fluorochemical surface active agents are mixtures of mono- and di-esters of phosphoric acid with alcohols (ROH) of the generalized formula $F(CF_2CF_2)_nCH_2CH_2OH$, where n can range from 3 to 8, and salts thereof, having the overall structure

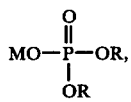

where M is H or a cation. Other such surface tension modifiers can be anionically, cationicaly or non-ionically N-substituted perfluoroalkyl sulfonamides. Yet other fluoro-surfactants, knwon to those skilled in the art, can be employed.

Fluorochemical surface active agents utilized in the barrier coatings of this invention are known to possess oil and grease repellent properties. The film forming polymers of the coating composition of this invention, on the other hand, are water repellent, they can moisture proof substrates coated with them. It has now been discovered that when a fluorochemical surface tension modifier such as a tertiary amine salt of mixtures of mono- and di-fluoroalkyl esters of phosphoric acid is mixed with a film forming polymer such as nitrocellulose, the coating so obtained on a paper substrate can show an approximately two-fold increase in water repellency and anapproximately ten-fold improvement in oil repellency over coatings based on the individual components alone.

While the exact mechanism of such synergism is not fully known, it is believed that the fluorochemical surface active agents utilized in this invention reduce the surface tension of both the film forming polymer solution such as a nitrocellulose lacquer and of the films formed therefrom. Oil or grease penetration of a coating not containing a fluorochemical surface active agent can take place by wicking through exposed cellular fibers of the cellulosic substrate. It is thought that the fluorochemical surface tension modifiers utilized in the barrier coatings of this invention can penetrate the fibers, lower their surface tension, and thereby prevent oil or grease from going through the coating.

The oil and water repellent coating composition of this invention can optionally contain a plasticizer. The coating can obtain up to 75 parts by weight of plasticizer, preferably 30–60, and more preferably 50–55 parts, when needed to impart flexibility to the coating. Another preferred range is 24–33 parts by weight. The amount of plasticizer utilized is such that the final coating is non-blocking at or below about 45° C. Phthalate esters and non-drying alkyd resin plasticizers can be utilized from among the many known to those skilled in the art. Preferred examples of plasticizer include dicyclohexyl phthalate, dibutyl phthalate, tricyclohexyl citrate, and maleic modified ester gum resin.

For certain end-use applications such as over-print varnish, the addition of a wax may be desired. Among such waxes are included microcrystalline and paraffin waxws. Usually the wax is no more than 5 parts by weight of the coating. At higher levels, wax can diminish the oil repellence of the coating.

To insure that the coating composition of this invention result in a uniform barrier coating, coalescing solvents can sometimes be included in the final coating formulation. Among such coalescing solvents are amyl acetate, butyl cellosolve acetate or diacetone alcohol; they are usually present in a weight ratio to the final coating of less than 1:10.

The barrier coating composition of this invention can be prepared by simply mixing the ingredients of the composition in random order.

The film forming polymers can be added as is but preferably they can be dissolved in a solvent prior to use. Fluorochemical surface tension modifiers are commonly available commercially, suspended in a liquid medium, and can be so used.

When the surface active agent of the barrier composition of this invention is the salt of the mixed fluoroalkyl esters of phosphoric acid it can be added directly to a nitrocellulose lacquer for example to obtain a solution of the coating composition. This composition can then be diluted to lower its viscosity or modified with a coalescing solvent. An exception to the random mixing order of the ingredients is created by the tendency of this surface active agent to coagulate upon the direct addition of a solvent.

The barrier coatings of this invention can be applied to one or both sides of the substrate to be treated. When the substrate is paper, the side of the substrate which has no pre-treatment is called the wire side of the paper and it is this side that will be coated with the barrier coating. If desired, however, the second side, sometimes called the clay side, can also be coated. In this case the barrier coating will function as an overprint varnish. All methods conventionally utilized to apply coatings to substrates can also be employed to coat with the repellent barrier coating of this invention. Among the more commonly utilized and preferred application methods are included the gravure roll, flexographic and offset methods, roller coating and spray coating. Since the coatings of this invention are applied from a non-aqueous solution, a drying step is required to produce the final coating. The coatings can be dried in an oven at between 65 and 205° C during a residence time of 1–5 seconds or can be dried at room temperature for the requisite time.

The coatings so deposited range in coating weight from about 1 to about 3 pounds per ream where a ream is 3,000 square feet, and preferably about 1½ pounds of coating per ream. For purposes of comparison, when the coating weight is 2 pounds per ream, the coating has a thickness of approximately 0.1 mil. Comparable coating weights are also useful when the substrate is not paper.

The oil and water repellent barrier coating of this invention can be utilized in a wide variety of enduse applications. Among packaging and non-packaging materials that can be coated with this barrier coating are bakery board, butter and margarine chips, candy board, cup stock, frozen food containers, plate stock, artist's papers, asphalt laminations, carbonizing tissue, carton overwraps, cover and text papers, envelopes, garbage and trash bags, label papers, paper placemats, release papers, soap containers, wallpaper, liner board, folding cartons, multiwall bags, flexible packaging, duplicator and reproduction papers, and support cards. Often paper so coated will have oil, grease, solvent, and water repellence without losing the appearance and feel of the paper.

For a barrier coating to function properly with the required oil, grease, and water repellence, it must meet a number of tests described below.

Oleophobic Test:

The oleophobic test measures the resistance of paper and paperboard to penetration by oil and grease. The test is useful for controlling the uniformity of the coating applied to the substrate. The barrier coating to be tested is placed on the substrate supported by a glass surface. A provision is made so that the bottom side can also be observed. Drops of fluid hydrocarbons of various surface tension are placed, without impact, on the surface of the substrate coated with the barrier coating. Beginning with the lowest numbered test liquid, drops are placed at several places on the test specimen. The drops are placed on the side of the coating which will be exposed to oil, grease or solvent during use. The drops are observed for three minutes on paper and for three or thirty minutes on paperboard. If no penetration of the coated substrate occurs, a drop of the next highest numbered test liquid is placed on the substrate and is again observed for three or thirty minutes. This procedure is continued until one of the test liquids penetrates the coating. The oil repellency rating of the coating is the highest numbered test liquid which will not penetrate for a period of three minutes on paper or for a period of three or thirty minutes on paperboard. The liquids listed below can be conveniently used for carrying out the oleophobic test.

| Oil Components | Oleophobic Rating Numbers |
|---|---|
| Mineral Oil | 1 |
| 65/35 Mineral Oil/n-Hexadecane | 2 |
| n-Hexadecane | 3 |
| n-Tetradecane | 4 |
| n-Dodecane | 5 |
| b-Decane | 6 |
| n-Octane | 7 |
| n-Heptane | 8 |

There is no absolute value of value of passing for a barrier coating of this invention. A passing value can usually be correlated with the end-use application. It is noted that the higher the value, the better the oil repellents of the barrier coatings.

Water Resistance Test:

This test is carried out in a manner similar to the one described above but using water in which a color indicator, for example copper sulfate, is dissolved. After a drop of the colored solution is placed on top of the coating, the bottom side of the paper is observed for the appearance of any color coming through with the water. In this test, it is considered to be a failure of the coating if any color at all shows up on the bottom side of the paper.

In the Examples below illustrating the invention, all parts are by weight unless otherwise indicated.

EXAMPLE 1

The following ingredients are mixed to obtain a solution:

| | |
|---|---|
| Ethyl acetate | 63 grams |
| Nitrocellulose (½ second viscosity, 70% by weight in ethanol) | 36 grams |

To this solution is then added 1.0 gram of a 33% by weight dispersion of the diethylamino ethanol salt of a mixture of mono- and di-fluoroalkyl esters of phosphoric acid, described above. The resultant composition is applied to a paper substrate with a number 5 wire-wound rod, dried at room temperature, and tested. The coated substrate passes the number 8 oil in the above described oleophobic test and shows no penetration by water.

EXAMPLE 2

A solution of 21.4 grams of poly(methyl methacrylate), 8.6 grams of benzyl butyl phthalate, and 70 grams of toluene is prepared to which then is added 5.0 grams of the above described fluorochemical surface tension modifier dispersion. A film is cast, dried, and tested as above. It passes a number 4 oil and the water resistance tests.

EXAMPLE 3

A solution is prepared from the following ingredients:

| | | |
|---|---|---|
| Acetone | 41.2 | grams |
| Isopropanol | 3.8 | grams |
| Nitrocellulose (½ second viscosity, 70% by weight in ethanol) | 24.0 | grams |
| Nitrocellulose (¾ second viscosity, 70% by weight in ethanol) | 6.0 | grams |
| Maleic modified ester gum resin [m.p. 125–135° C, acid number 28–40, Gardner-Holdt viscosity (60% in toluene): L-R] | 9.4 | grams |
| Dicyclohexyl Phthalate | 14.0 | grams |

To this solution is added 1.6 grams of a dispersion of the above described fluorochemical surface tension modifier. The resultant composition is applied to a paper substrate as described above, dried for approximately 5 seconds under a heat gun. The resulting coating passes number 8 oil and the water resistance tests.

EXAMPLE 4

The following ingredients are combined to form a solution:

| | | |
|---|---|---|
| Acetone | 26.3 | grams |
| Nitrocellulose (½ second viscosity, 70% by weight in ethanol) | 41.2 | grams |
| Maleic modified ester gum (as described in Example 3) | 13.0 | grams |
| Dibutyl Phthalate | 17.5 | grams |

To this is added with stirring 2.0 grams of a dispersion of the above described fluorochemical surface tension modifier and the composition applied to paper as described in Example 3, dried, and tested. The barrier coating passes number 8 oil and the water penetration tests.

EXAMPLE 5

A solution is prepared from the following ingredients:

| | | |
|---|---|---|
| Acetone | 26.8 | grams |
| Nitrocellulose (½ second viscosity, 70% by weight in ethanol) | 30.1 | grams |
| Nitrocellulose (¾ second viscosity, 70% by weight in ethanol) | 10.0 | grams |
| Maleic modified ester gum (as described in Example 3) | 12.7 | grams |
| Dibutyl Phthalate | 1.8 | grams |
| Dicyclohexyl Phthalate | 15.8 | grams |

To this composition is added 2.9 grams of a dispersion of the fluorochemical surface tnesion modifier as shown in Example 1, the composition applied to paper, dried, and tested as in Example 3. This composition passes number 8 oil and the water penetration tests.

What is claimed is:

1. A coating composition consisting essentially of a non-aqueous solution of:
   (A) 25–99.5 parts by weight, based on the weight of (A) plus (B) plus (C), of nitrocellulose film-forming polymer;
   (B) 0.5–10 parts by weight, based on the weight of (A) plus (B) plus (C), of a fluorochemical surface tension modifier selected from the group consisting of:

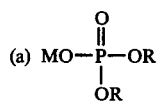

where
   M = H or cation;
   R = H, CH$_2$CH$_2$(CF$_2$CF$_2$)$_n$F or mixtures thereof, and no more than one R can be H;
   and
   n = 3–8; and
   (b) an anionically, cationically or non-ionically N-substituted perfluoroalkyl sulfonamide; and
   (C) 0–75 parts by weight, based on the weight of (A) plus (B) plus (C), of a plasticizer.

2. The coating composition of claim 1, wherein nitrocellulose is present to the extent of 40–60 parts by weight, said fluoroalkyl surface tension modifier is present to the extent of 1–3 parts by weight, and said plasticizer is present to the extent of 30–60 parts by weight.

3. A coating composition consisting essentially of a non-aqueous solution of:
   (A) 45–50 parts by weight, based on the weight of (A) plus (B) plus (C), of nitrocellulose film forming polymer;
   (B) 1–2 parts by weight, based on the weight of (A) plus (B) plus (C), of a fluorochemical surface tension modifier of the formula:

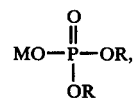

where
   M = H or cation and
   R = H, CH$_2$CH$_2$(CF$_2$CF$_2$)$_n$F or mixtures thereof and
   n = 3–8;
   and
   (C) 50–55 parts by weight, based on the weight of (A) plus (B) plus (C), of a plasticizer.

* * * * *